(12) United States Patent
Tomblin et al.

(10) Patent No.: US 12,360,057 B2
(45) Date of Patent: Jul. 15, 2025

(54) LASER SHEAROGRAPHY END EFFECTOR FOR INDUSTRIAL ROBOT SYSTEM

(71) Applicant: Wichita State University, Wichita, KS (US)

(72) Inventors: John Tomblin, Wichita, KS (US); Waruna Seneviratne, Wichita, KS (US); Caleb Saathoff, Wichita, KS (US); Christopher Pini, Wichita, KS (US)

(73) Assignee: WICHITA STATE UNIVERSITY, Wichita, KS (US)

( * ) Notice: Subject to any disclaimer, the term of this patent is extended or adjusted under 35 U.S.C. 154(b) by 444 days.

(21) Appl. No.: 18/049,462

(22) Filed: Oct. 25, 2022

(65) Prior Publication Data

US 2023/0146116 A1    May 11, 2023

Related U.S. Application Data

(60) Provisional application No. 63/271,529, filed on Oct. 25, 2021.

(51) Int. Cl.
  *B25J 15/00* (2006.01)
  *B25J 15/04* (2006.01)
  (Continued)

(52) U.S. Cl.
  CPC ...... *G01N 21/9515* (2013.01); *B25J 15/0019* (2013.01); *B25J 15/0491* (2013.01);
  (Continued)

(58) Field of Classification Search
  CPC ......... G01N 21/9515; G01N 2201/021; G01N 2021/8472; B25J 15/0491; B25J 15/00; B25J 15/0019; B25J 11/00
  See application file for complete search history.

(56) References Cited

U.S. PATENT DOCUMENTS

| 2015/0215584 A1* | 7/2015 | Tapia | H04N 7/183 |
| | | | 348/125 |
| 2023/0052634 A1* | 2/2023 | Tomblin | B29C 65/8253 |

(Continued)

OTHER PUBLICATIONS

Fernandez et al., Distributed system for online quality control and production process assessment for the automobile industry, 2001, IEEE, p. 188-192 (Year: 2001).*

(Continued)

*Primary Examiner* — McDieunel Marc
(74) *Attorney, Agent, or Firm* — Stinson LLP

(57) ABSTRACT

A laser shearography end effector for inspection in an automated inspection and repair system for composite parts. A laser shearography system including an excitation system and a laser shearography camera is supported on a frame for movement with the frame. A slave tool changer is secured to the frame for releasably and operatively connecting the inspection tool to an industrial robot such that the industrial robot can move the inspection tool along a work piece as the laser shearography system inspects the work piece and such that the laser shearography end effector is interchangeable with at least one other automatic inspection end effector or repair end effector of the automated inspection and repair system.

20 Claims, 14 Drawing Sheets

(51) Int. Cl.
  *G01N 21/95* (2006.01)
  *G01N 21/84* (2006.01)
(52) U.S. Cl.
  CPC ............... *G01N 2021/8472* (2013.01); *G01N 2201/021* (2013.01)

(56) References Cited

U.S. PATENT DOCUMENTS

2023/0131624 A1* 4/2023 Tomblin ................ B25J 15/04
  700/253
2023/0146701 A1* 5/2023 Tomblin ................ B25J 9/1617
  700/245

OTHER PUBLICATIONS

Biro et al., Integration of a scanning interferometer into a robotic inspection system for factory deployment, 2020, IEEE, p. 1371-1375 (Year: 2020).*

Biegelbauer et al., Robust and fully automated robotic bore inspection for high variant parts, 2004, IEEE, p. 9-13 (Year: 2004).*

Ma et al., On Path Generation Method for Laser Cleaning Robot Based on Line Structured Light, 2020, IEEE, p. 5953-5957 (Year: 2020).*

Zhongsheng et al., Defects detection of composite material using laser shearography, 2011, IEEE, p. 1-4 (Year: 2011).*

Ansari et al., Evaluation and strain measurement of solar cells by using digital speckle pattern shearography, 2005, IEEE, p. 231-233 (Year: 2005).*

Jorez et al., Strain imaging in thermoelectric devices by laser probe shearography, 2001, IEEE, p. 503-506 (Year: 2001).*

Liu et al., Nondestructive Visualization and Quantitative Characterization of Defects in Silicone Polymer Insulators Based on Laser Shearography, 2019, IEEE, p. 6508-6516 (Year: 2019).*

* cited by examiner

LASER SHEAROGRAPHY END EFFECTOR FOR INDUSTRIAL ROBOT SYSTEM

CROSS-REFERENCE TO RELATED APPLICATION

This application claims priority to U.S. Provisional Patent Application No. 63/271,529, filed Oct. 25, 2021, which is hereby incorporated by reference in its entirety.

FIELD

This disclosure generally pertains to a robot end effector for non-destructive testing in an automated inspection and repair system for composite parts and methods and industrial robot systems employing the end effector in question.

BACKGROUND

There is a need for an improved inspection system for composite parts. In particular, there is a need for an improved non-destructive testing tool that can be used on an industrial robot interchangeably with other non-destructive testing tools and/or robotic repair tools so that multiple inspection and repair processes can be conducted by a single robot.

SUMMARY

In one aspect, a laser shearography end effector for inspection in an automated inspection and repair system for composite parts comprises a frame. A laser shearography system is supported on the frame for movement with the frame. The laser shearography system includes an excitation system and a laser shearography camera. A slave tool changer is secured to the frame. The slave tool changer is configured to releasably and operatively connect the laser shearography end effector to an industrial robot such that the industrial robot can move the laser shearography end effector for inspecting the work piece.

In another aspect, a method of inspecting a composite part comprises connecting a master tool changer of an industrial robot to the slave tool changer of a laser shearography end effector, whereby the laser shearography end effector is mounted on an end of the industrial robot for movement with the industrial robot and the laser shearography end effector is operatively connected to the master tool changer for drawing power from a power system of an automated inspection and repair system and for communication with a master controller of the automated inspection and repair system. The industrial robot and the laser shearography end effector are subsequently used to inspect the composite part. The laser shearography end effector is subsequently disconnected from the industrial robot. The industrial robot is subsequently used with another end effector to perform another inspection or repair operation on the composite part.

In another aspect, an automatic inspection and repair system comprises an industrial robot, a laser shearography end effector releasably connected to the industrial robot such that the laser shearography end effector is interchangeable with at least one other automatic inspection end effector or repair end effector, and a control system configured to control both the industrial robot and the laser shearography end effector to coordinate robot positioning and shearography imaging for inspecting a composite part.

Other aspects will be in part apparent and in part pointed out hereinafter.

BRIEF DESCRIPTION OF THE DRAWINGS

Corresponding parts are given corresponding reference characters throughout the drawings

DETAILED DESCRIPTION

The present disclosure generally pertains to a system for automating certain aspects of inspection and repair of composite parts. Additional information about such a system is provided in U.S. patent application Ser. No. 17/828,558, filed May 31, 2022, and assigned to the same assignee as the present disclosure, which is hereby incorporated by reference in its entirety. As described in U.S. patent application Ser. No. 17/828,558, an exemplary embodiment of the system is implemented to inspect and repair composite rotorcraft blades to aid in sustainment programs that ensure airworthiness. However, it will be understood that the principles of the system can be adapted for use with various other composite parts. Further, although the system described below is used in a sustainment program, it is contemplated that the inspection and repair system might also have other applications, e.g., quality control during initial manufacture.

Figure 1:
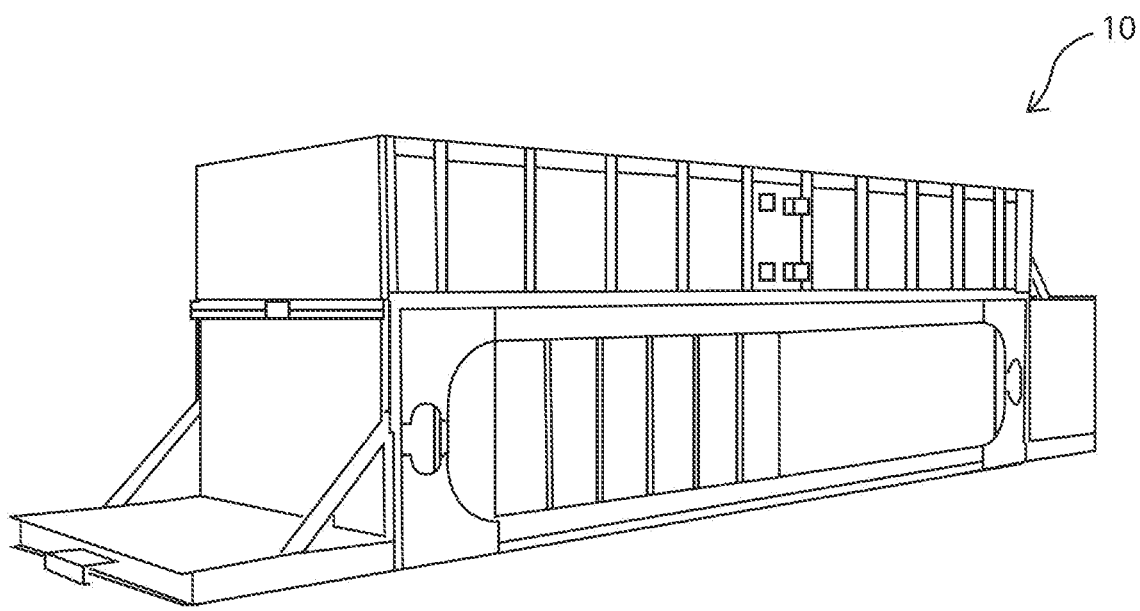
FIG. 1 is a perspective of a joint autonomous repair verification an inspection system (hereinafter, JARVIS) cell in a deployed configuration.
Figure 2:
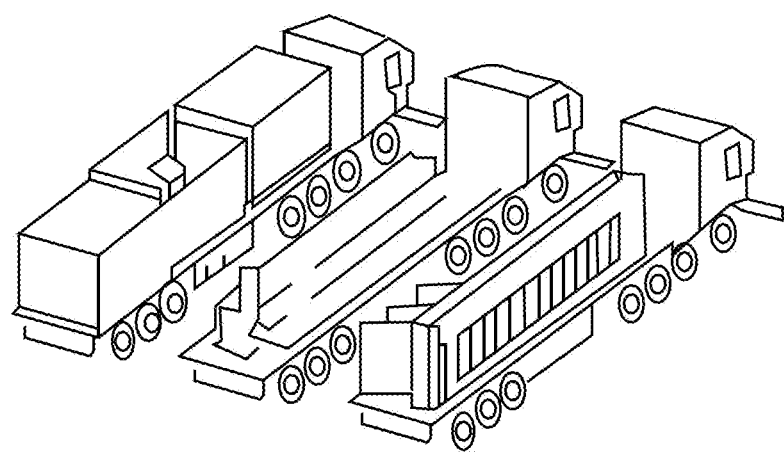
FIG. 2 is a perspective of the JARVIS cell in a transport configuration.
Figure 2:
Figure 3:
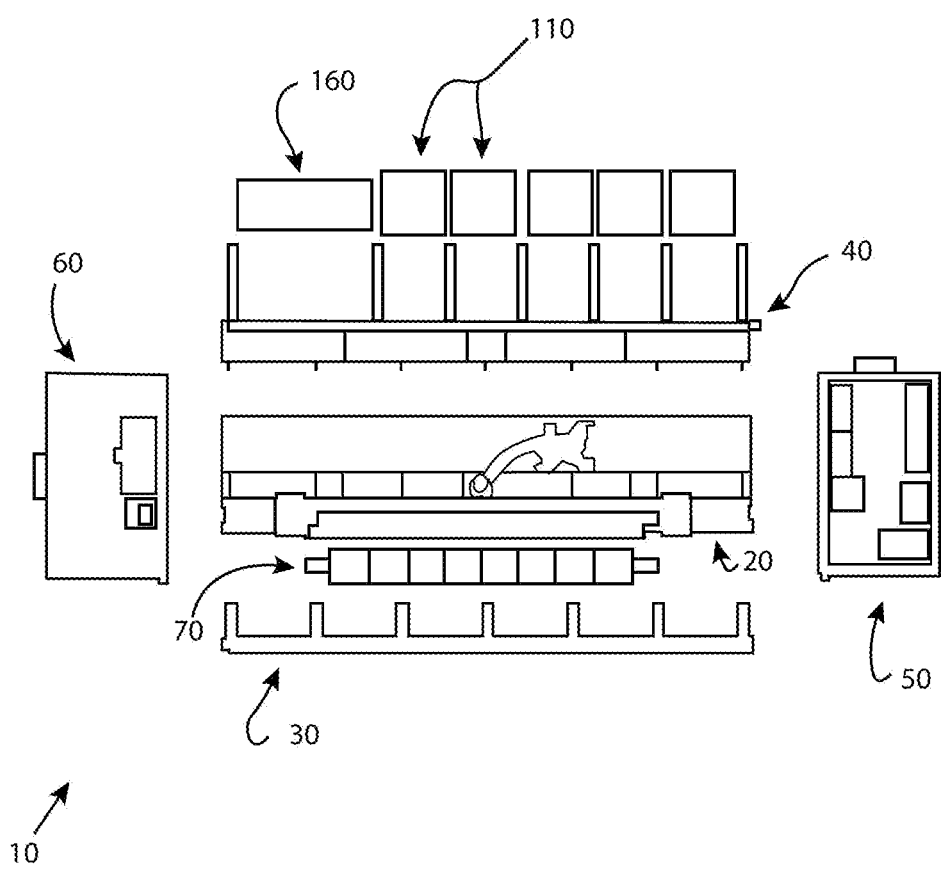
FIG. 3 is an exploded plan view of the JARVIS cell.
Figure 4:
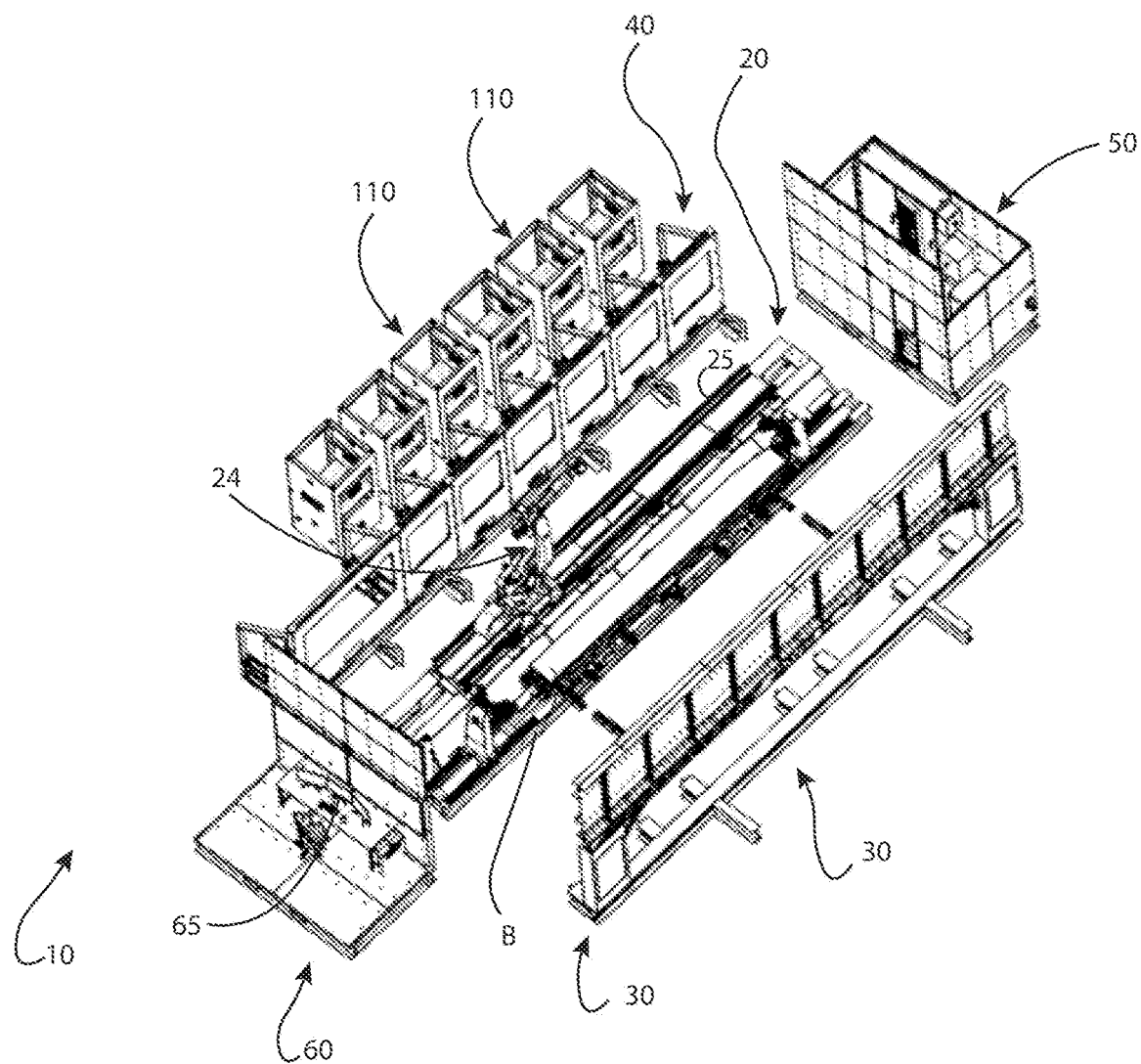
FIG. 4 is an exploded perspective of the JARVIS cell.

Referring to FIGS. 1-4, an exemplary embodiment of a joint autonomous repair verification an inspection system (hereinafter, JARVIS) cell is generally indicated at reference number 10. FIG. 1 shows the JARVIS cell 10 deployed on site, and FIG. 2 shows the JARVIS cell broken down onto three flatbed trailers for transport. Design elements for the illustrated JARVIS cell are based on intended platform size and features (e.g., the size of the cell is driven by the application-specific needs of inspecting large main rotorcraft blades). It will be understood that other embodiments can be sized appropriately for other applications.

In general, the JARVIS cell 10 comprises a blade processing station 20 (hereinafter, BPS) (broadly, a 'part processing station'), a blade induction station 30 (hereinafter, BIS) (broadly, a 'part induction station'), a tool docking station 40 (hereinafter, TDS), an equipment supply station 50 (hereinafter, ESS), a control station 60 (hereinafter, JCS), a support cart 70 (hereinafter, BSC), a set of modular tool cartridges 110 (hereinafter, MTCs), and a patch machining cartridge 160 (hereinafter, PMC). All stations can be manufactured, stored, and shipped independently to adhere to shipping size constraints. As shown in FIG. 2, in one or more embodiments, the total truck requirement for shipment is three flatbed trucks. With this configuration, MTCs 110, PMC 160, JCS 60 and ESS 50 will be transported on truck one. Truck two will transport the BPS 20 and industrial robot that has been removed from the BPS track system. Truck three transports the BIS 30 and TDS 40. All delicate instruments can be removed from the MTCs 110 and other cell locations to ensure no damage occurs during transit.

The illustrated BPS 20 broadly comprises a robot and track assembly 21 (broadly, a robot) configured to reach the full length and width of the part. In the illustrated embodiment, the robot 24 comprises a KUKA KR210 R3100 robot and the track system 25 comprises a KUKA KL4000 track system, but it will be understood that other industrial robots and track systems could also be used without departing from the scope of the disclosure. Furthermore, in certain embodiments, the BPS robot could comprise an industrial robot arm with no track system, a gantry system with no robot arm, etc., depending on the requirements of the application. The robot 24 is configured to perform all actions in the JARVIS cell 10. In the illustrated embodiment, the robot 24 is equipped with a master tool changer 26 that is configured to interchangeably connect to a plurality of different slave tool changers associated with a plurality of different robot end effectors used for different processes in the JARVIS cell.

Figure 5:
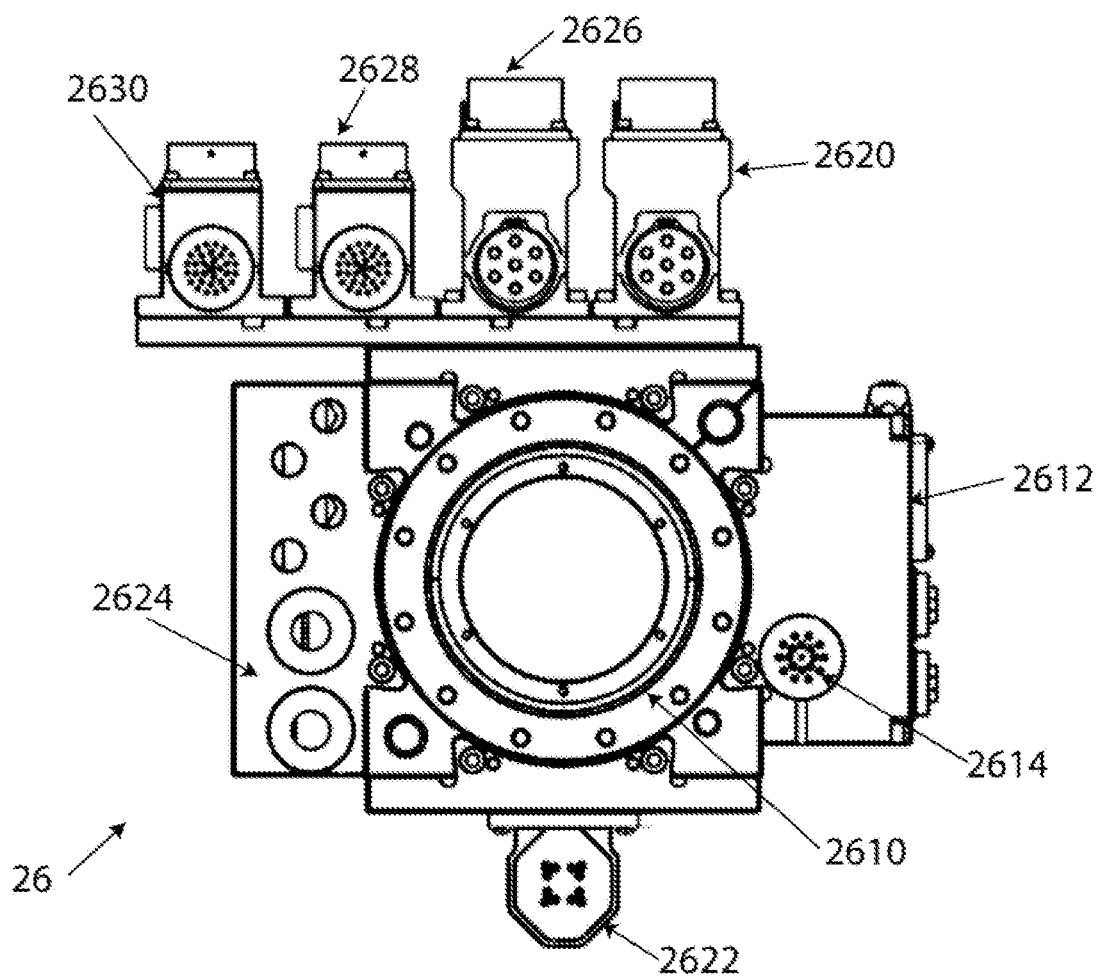
FIG. 5 is an elevation of a master tool changer of the JARVIS cell.

Referring to FIG. 5, in an exemplary embodiment, the master tool changer 26 is a custom-configured ATI quick change robotic tool changer with a plurality of connectors for interchangeably connecting the robot 24 to a plurality of different types of robot end effectors with different requirements. The master tool changer 26 comprises a mounting interface 2610 configured for interchangeably coupling to the slave tool changers of the various robot end effectors used in the JARVIS cell, whereby the master tool changer 25 mounts individual end effectors on the robot. The mounting interface 2610 comprises a pneumatic locking actuator 2612 configured to selectively lock with each slave tool changer to secure the respective end effector in place with respect to the master tool changer so that the end effector moves with the robot in relation to the composite part. As understood by those skilled in the art, the locking actuator 2612 comprises a signal connector 2614 that couples to a mating signal connector on each slave tool changer before the locking actuator actuates the locking mechanism. When the connector 2614 is mated to a mating connector of the slave tool changer, there is an exchange of signals between the master tool changer 26 and the slave tool changer by which the master tool changer determines (i) that it has been properly aligned with the slave tool changer for locking and (ii) which type of end effector it has been connected to.

In the JARVIS cell 10, the master tool changer 26 is capable of connecting the robot 24 to many different types of robot end effectors with different input/output requirements. To accommodate all of the input/output requirements, the master tool changer 26 is equipped with a standard power connector 2620, an Ethernet connector 2622, a pneumatic connector 2624, two special-purpose plasma generator connectors 2626, 2628, and a pulsed thermography connector 2630. As explained in U.S. patent application Ser. No. 17/828,558, the JARVIS cell 10 can be configured to run entirely from one 480-V connection to main power and one connection to a 120-psi compressed air source. The power connector 2620 is configured to convey power (e.g., 120-V power) from the main power source to a robot end effector. The pneumatic connector 2624 is likewise configured to convey compressed air from the compressed air source to a robot end effector. The Ethernet connector 2622 is configured pass signals between the JARVIS cell control system and the robot end effector. The thermography connector 2630 is configured to make a connection specific to a thermography end effector, and the plasma generator connectors 2626, 2628 are configured to make high voltage connections for conducting atmospheric plasma surface preparation treatment from a robot end effector.

Referring again to FIGS. 1-4, the support cart 70 is configured to support the part in the JARVIS cell 10 and facilitate transport of the part into and out of the cell. The part and the support cart 70 move into and out of the JARVIS cell through the BIS 30. And BIS 30 is configured to selectively close the JARVIS cell 10 to meet the required safety specifications of the inspection and repair operations taking place therein. The TDS 40 defines a plurality of tool docks 41 with which the MTCs 110 are configured to connect. Each MTC 110 contains a robot end effector that can attach to the end of the robot 21 for performing an inspection or repair operation.

The MTCs 110 include robotic end effectors for non-destructive testing, such as a camera, a laser three-dimensional scanner, a pulsed thermography end effector, and a shearography end effector, as well as a milling end effector, an atmospheric plasma generator (broadly, a surface preparation end effector), a composite surface preparation verification system, and a laser ablation end effector. Below this disclosure focuses on exemplary embodiments of a laser shearography inspection end effector and its integration with the JARVIS cell and use in the JARVIS cell processes.

The power and compressed air connections are made at the ESS 50, and the human operator is stationed within the control station 60 to operate/monitor the JARVIS cell 10. Through a series of automated and/or user-controlled operations, the JARVIS cell 10 is configured to inspect and then facilitate the repair of the composite part. The JARVIS cell 10 operates in combination with a database that stores unique records of the inspection data and repairs for every composite part that is addressed by the cell.

Exemplary embodiments of certain processes that can be performed using the JARVIS cell 10 will now be briefly described. In general, the JARVIS cell 10 is configured for use in verifying and inspecting repaired composite parts such as rotorcraft blades to ensure that the part is repaired to meet required specifications. As explained more fully below, the JARVIS cell 10 can also be used to perform certain processes involved in making the necessary repairs to a composite part. The inspection methods employed using the JARVIS cell 10 can generate a robust data set with information about the composite part and repairs thereto. In addition to using these data for repair verification and making further repairs to the composite part, these data can be used outside of the cell processes in downstream continuous improvement processes.

Broadly speaking, this disclosure expressly contemplates 15 different cell processes, which will be described in detail below: (1) Blade Identification; (2) Blade Loading; (3)

Virtual Scanning; (4) Digital Imaging; (5) Laser Shearography; (6) Pulsed Thermography; (7) Static Balance; (8) Core Ply and Repair Patch Design Selection; (9) Paint Removal; (10) Damage Removal; (11) Core Restoration; (12) Core Shaping; (13) Surface Preparation and Bond Readiness Testing; (14) Repair Patch Machining; and (15) Adhesive Application. This disclosure focuses on use of the cell with rotorcraft blades, but it will be understood that the same processes can be adapted for other types of composite parts.

In an exemplary process, a composite part is introduced into the cell through the BIS 30. Initially, the part is identified for purposes of maintaining the database. If the part has previously been subject to inspection or repair by the cell, an identifier for the cell can be determined by a barcode scan, text recognition, or manual entry of a known identifier for the part. Otherwise, a new database record for the part is created with a new unique identifier.

An inspection system of the cell 10 subsequently conducts a detailed nondestructive inspection of the blade. In an exemplary embodiment, the inspection includes conducting a three-dimensional laser scan of the part from which a detailed three-dimensional model of a portion of or the entirety of the part can be created. Scanning provides a foundation for all other data to be displayed and for orienting the robot in relation to the part for performing subsequent inspection and repair processes. All NDI data uses the surface model generated in the virtual scanning step to provide the end user with the ability to visualize indications of damage. Virtual scan data is also utilized in the generation of tool paths for processing and provides high-fidelity geometrical details for quality control of repair machining operations. As known to those skilled in the art, the industrial robot is controlled by reference to a robot positioning coordinate system. The JARVIS software is configured to map the three-dimensional model of the composite part to robot positioning coordinates so that subsequent robot processes are precisely coordinated to the composite part.

The inspection can further comprise taking a series of photographs of the part from one or more (e.g., all angles), conducting a pulsed thermography scan of the part, and conducting a shearography scan of the part. In one or more embodiments, a plurality of the above-described inspection steps are conducted by the robot 24. For instance, the robot can attach to a laser scanner end effector stored in one of the MTCs 110 and then perform a laser scan to obtain the three-dimensional model of the part. Subsequently, the robot can release the laser scanner into its MTC 110 and attach to a digital camera end effector stored in another MTC 110 and then take the required images of the part. The robot 24 can then release the camera end effector into its MTC 110 and attach consecutively to a shearography end effector and pulsed thermography end effector in their respective MTCs 110 to conduct shearography and pulsed thermography scanning. It will be apparent that other NDI end effectors can be used from other MTCs 110 if desired.

Upon completion of the non-destructive testing, a damage assessment system of the cell 110 is configured to create a digital twin of the part and store the digital twin in the inspection and repair database. The digital twin comprises the three-dimensional model of the part and each of the other types of non-destructive testing data wrapped onto the three-dimensional model. In an exemplary embodiment, the system uses an image stitching process to stitch together a set of overlapping NDI images of one or more types of NDI data to form a composite image that is wrapped onto the three-dimensional model. For instance, one embodiment of the cell creates a stitched composite photographic image of the part, a stitched composite shearography image of the part, and/or a stitched composite pulsed thermography image of the part that are wrapped onto the three-dimensional model.

The digital twin is stored in the inspection and repair database for future reference and is also used to assess the part for damage. In an exemplary embodiment, the damage assessment system may automate the damage assessment process by training a convolutional neural network to identify locations of damage in the NDI images. After the damage is assessed, either by a user or a machine learning image analysis model, the cell 10 can be used to repair the composite part.

In an exemplary embodiment, a repair system of the cell 10 facilitates composite scarf joint repair and core repair. For each type of repair, paint is first removed from the repair area. In an exemplary embodiment, the robot 24 attaches to a color-selective laser ablation tool to perform the paint removal. The laser ablation end effector may suitably be held in an MTC 110 or be an internal component of the cell. In certain embodiments, the cell 10 includes a laser projection system that is configured to project an image onto the area where a repair is to be conducted. After removing paint from the area in question, skin and/or core material is removed from the part. Suitably, the robot 24 attaches to a milling end effector (which may be held in an MTC or maintained as a separate part) and uses the milling tool to automatically remove the damaged material based on coordinates generated from the nondestructive testing data.

The cell 10 can conduct a scarf repair of damaged skin of the composite part. Before machining the scarf repair patch, the cell 10 scans the area that has been prepared for repair. Based on the scan data, the system automatically generates a shape file for the scarf repair patch. A precured laminate is loaded onto a Patch Machining Cartridge 160 (PMC) of the cell 10. The robot 24 uses the milling end effector to cut the precured laminate to the determined size and shape for the scarf repair patch on the PMC 160.

In an exemplary embodiment, the robot attaches to an atmospheric plasma generator and uses the atmospheric plasma generator to prepare the surface for bonding by increasing the surface energy of the bonding surfaces.

The cell can project an image onto the surface of the composite part indicating where adhesive should be applied. A user can manually position a structural adhesive film and then position the machined scarf repair patch onto the adhesive.

For a core repair, following scarf machining and after the core material is removed, a core plug formed from the same material is machined to fit tightly into the pocket formed by removal of the damaged core section. The core plug can be formed outside of the cell in an appropriate process. Before placing the core plug into the part, the surfaces of the composite part are preferably prepared for bonding. Again, the robot 24 uses the atmospheric plasma generator to prepare the surface for adhesion. The core plug is then adhered in the desired location before the robot 24 again uses the milling end effector to shape the core plug in-place to match the contour of the part. In an exemplary embodiment, the cell 10 uses a laser projection system to project an image onto the composite part indicating the location where adhesive should be applied. Suitably, an adhesive film can be manually applied to the indicated location before placing the plug and subsequently machining the core repair to the desired contour.

When repair is complete, another inspection of the composite part can be conducted to create and store a detailed record (e.g., digital twin) of the repair. The repair records stored in the database are believed to provide utility in long-term sustainment operations. For example, a technician can evaluate the past inspection and repair records for a composite part to make a more informed assessment of whether the composite part can withstand another required repair or update.

The JARVIS cell employs a software framework that is broadly configured to (1) control the automated processes discussed above, (2) visualize the composite part and NDI data, (3) manage the JARVIS database, and (4) execute machine learning algorithms based on the NDI data and database content. The JARVIS software framework comprises a set of connected software modules executed by a processor of the JARVIS workstation 65. It will be understood that software modules comprise computer executable code stored in processor-readable memory and that one or more processors at the same or remote locations can be used to execute the code to carry out the software module's function. In an exemplary embodiment, the JARVIS cell 10 employs any combination of the following software modules: a communication module, a visualization module, an image stitching module, a database, a feature detection module (broadly, a damage assessment module), a toolpath generation module, and one or more NDI modules, such as a digital imaging module, a virtual scanning module, a thermography module, and a shearography module.

Figure 6:
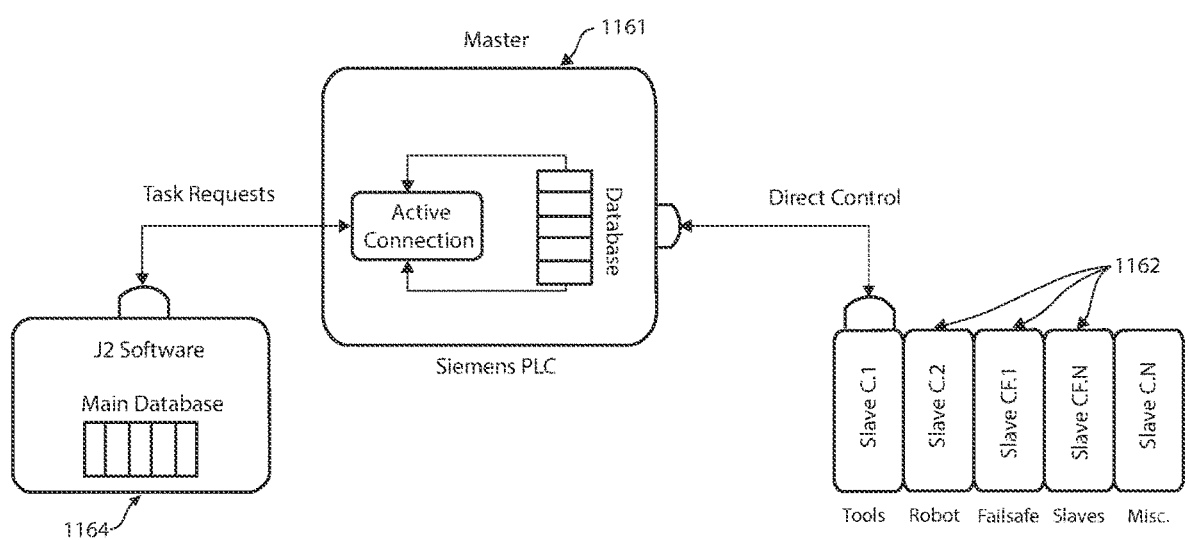
FIG. 6 is a schematic block diagram of a control system of the JARVIS cell.

Referring to FIG. 6, the JARVIS cell 10 fundamentally employs a master-slave control system 1160 comprising a main cell PLC 1161 and a plurality of slave controllers 1162 for various components of the cell. The JARVIS software framework 1164 is the front-end operation through which the operator interfaces with the system 1160 via a user interface device such as the workstation 65. The JARVIS software framework 1164 acts as an intermediary for the PLC 1161, which is used as the master, and the robot or tools, which are slaves 1162 to the PLC. Therefore, the software framework 1164 will not give commands directly to the tools or robot. With the software framework 1164 being a large collection of software modules, significant error could occur. Thus, allowing the PLC 1161 to handle routine operations for automation mitigates chances for error.

Figure 7:
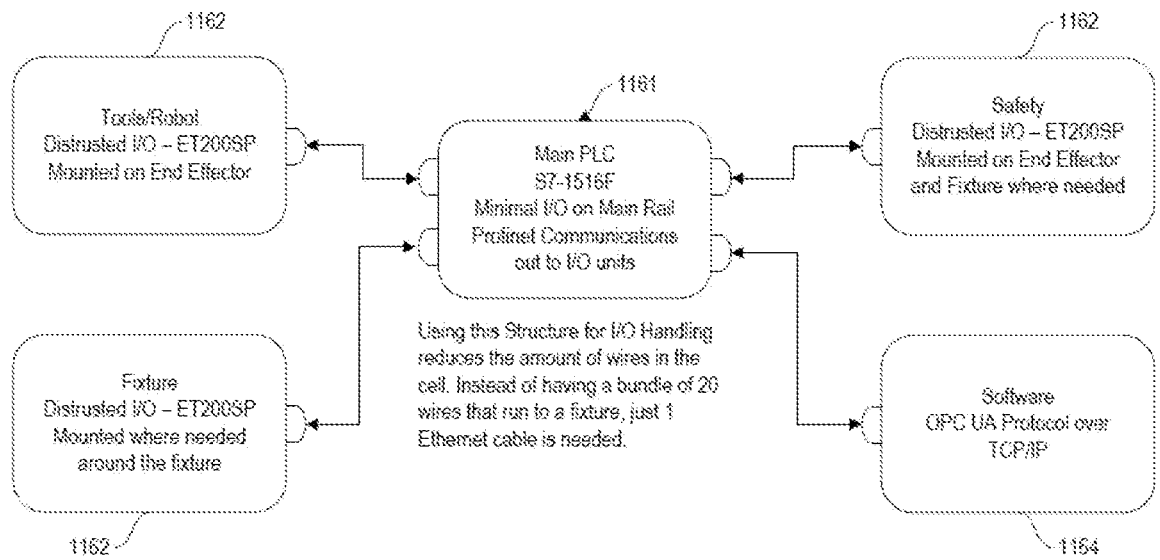
FIG. 7 is another schematic block diagram of a control system of the JARVIS cell.

In one or more embodiments, the JARVIS software framework 1164 establishes a connection directly to the PLC 1161 through an Ethernet/IP connection. The master PLC 1161 contains a local database on-board that allows it to hold and handle volatile data from the tools and robot. Any data being passed from the tools or robot 24 is transmitted through the PLC 1161 and sent directly to the software 1164. This is unless there is an alternate connection method to one of the slave units that allows data transmission directly to the software. These alternate connections are typically also Ethernet/IP connections. Ethernet/IP is the preferred connection method due to its excellent data throughput. Additionally, it allows multiple slave units over a singular connection. An overview of the connections for input/output handling are shown in FIG. 7.

The inputs and outputs of the master-slave allow the main PLC 1161 to handle most of the I/O without the software 1164 needing to poll the slave systems 1162 continuously for updated values. In one or more embodiments, the software 1164 connects to the main PLC 1161 via Open Platform Communications (OPC) using Ethernet/IP. The slave systems 1162 are typically connected via Profibus for core systems and Profisafe for safety systems.

Figure 8:
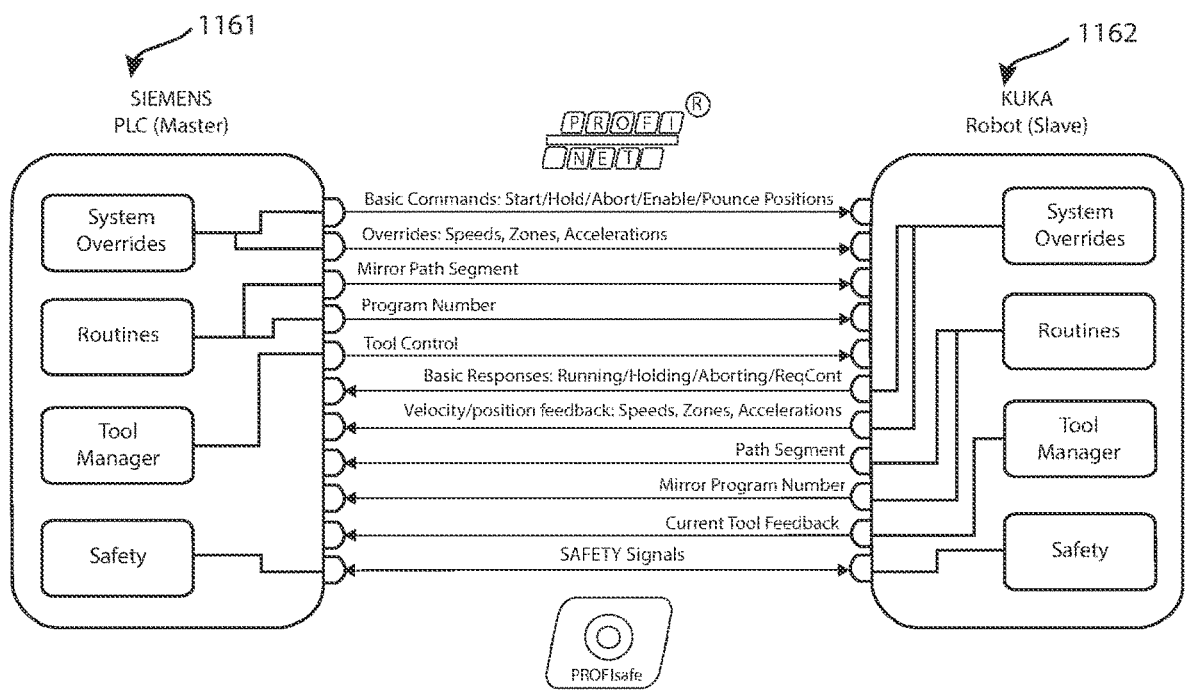
FIG. 8 is a schematic block diagram of a control subsystem of the JARVIS cell including a master PLC and a slave robot controller.

Referring to FIG. 8, the illustrated embodiment uses the Profinet protocol to handle the communication between the master and slave units 1161, 1162. Profinet is an industry technical standard that is used for communication between many factory and automation devices. Profinet establishes connection between the master and slave units 1161, 1162 using an Ethernet/IP connection for fast and reliable data transmission. The Profinet structure mimics the master-slave configuration by having an IO-Controller for the master 1161 and IO-Devices for the slaves 1162. Basic system commands like robotic movements such as start, hold, pounce, etc. are typically transmitted through the Profibus protocol. Profibus also handles the PLC routines such as program number selection, and mirroring path segments.

Figure 9:
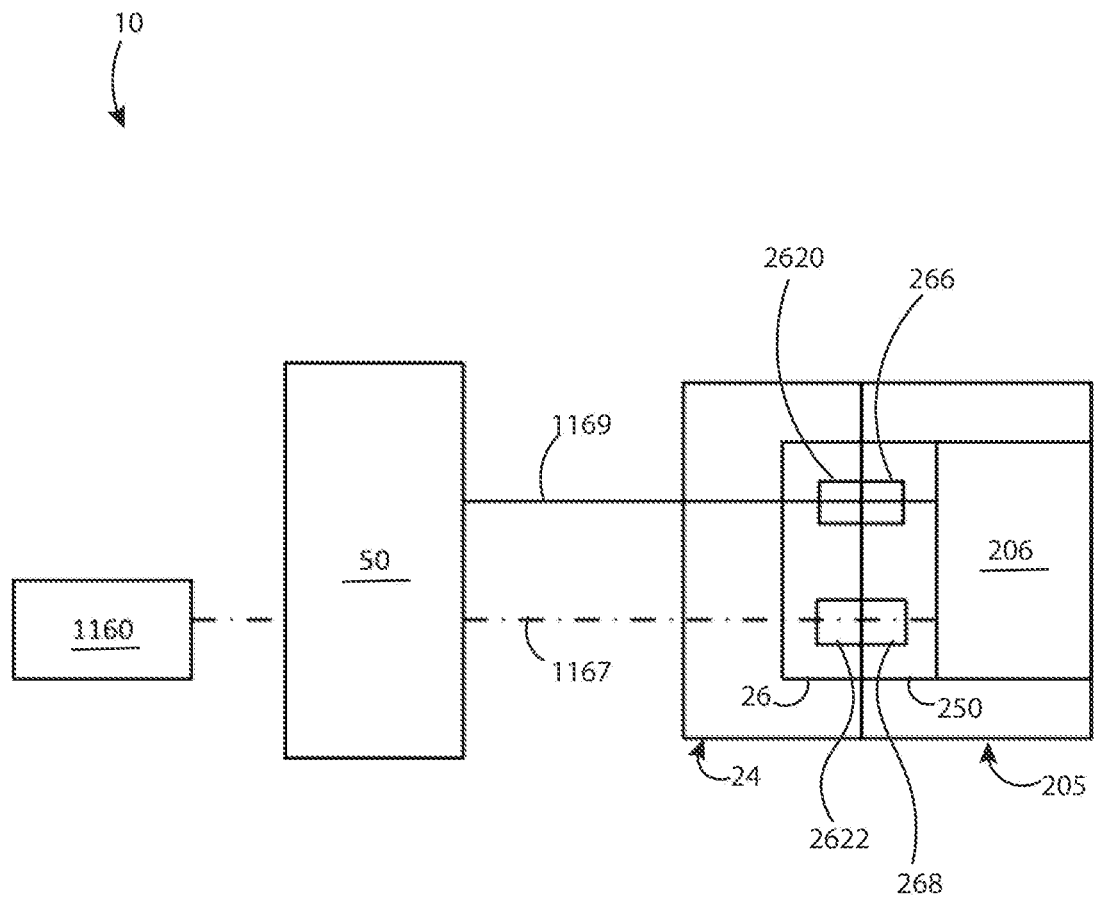
FIG. 9 is a schematic block diagram of the JARVIS cell operatively connected to a laser shearography end effector.
Figure 10:
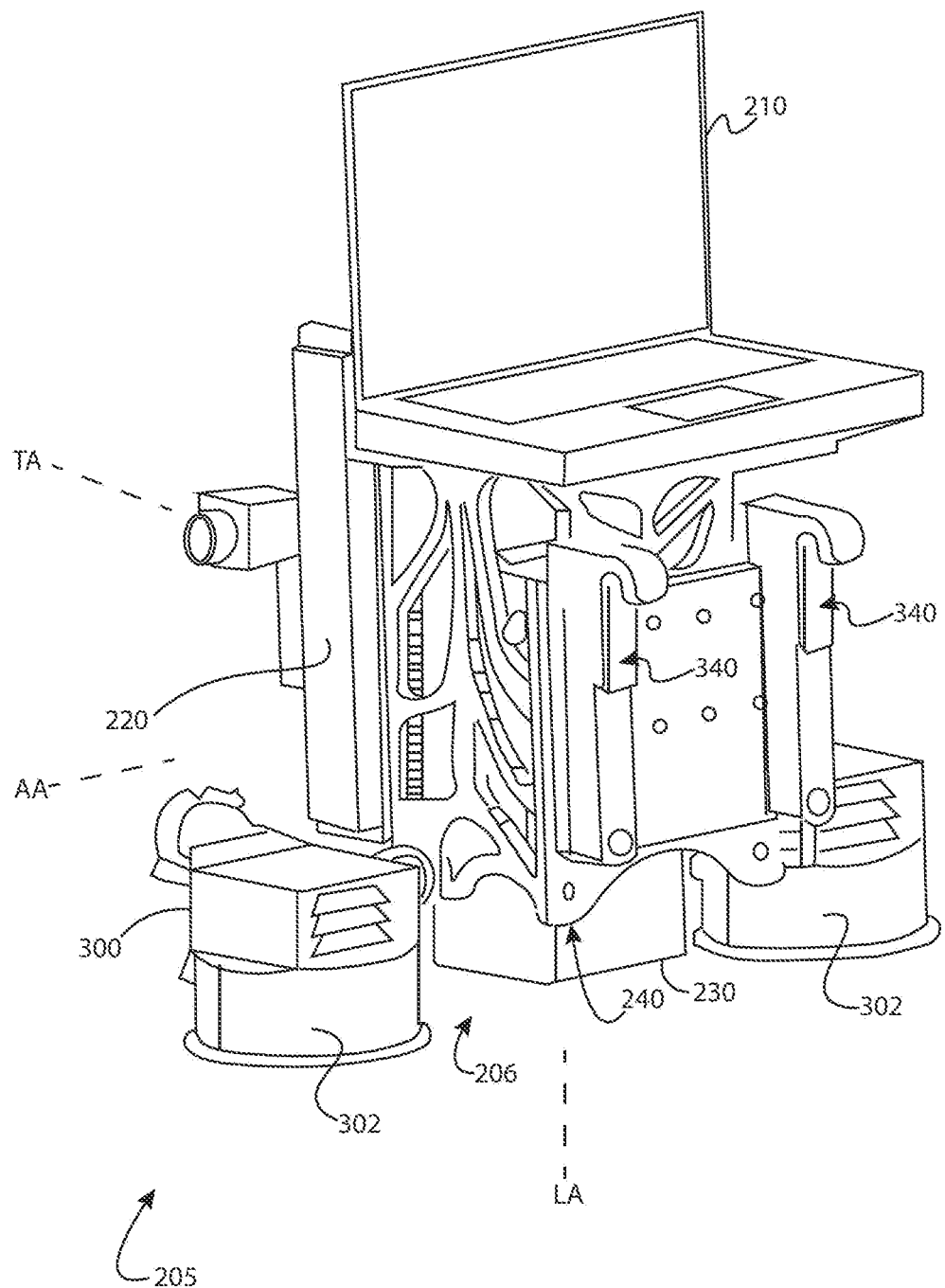
FIG. 10 is a perspective of the laser shearography end effector.

Referring now to FIG. 9, an exemplary embodiment of the JARVIS cell 10 in a configuration for conducting laser shearography inspections is shown schematically. In this configuration the robot 24 is operably (and releasably) coupled to a laser shearography end effector, generally indicated at reference number 205. The laser shearography end effector is broadly configured to releasably connect to the JARVIS robot 24 and be operated by the JARVIS control system 1160. As shown, control and monitoring signals are passed between the JARVIS control system 1160 and the end effector 205 via the ESS 50 and an Ethernet line 1167. The end effector 205 is configured to draw power from the ESS 50 via a power line 1169. In general, the JARVIS cell 10 uses the laser shearography end effector 205 to conduct nondestructive testing of composite materials to identify damage. As will be explained in further detail below, the JARVIS cell 10 is configured to use the shearography end effector to inspect the composite part, then the shearography end effector 205 is disconnected from the industrial robot 24. The industrial robot 24 is then used with another end effector (not shown) to perform another inspection or repair operation on the composite part, using the data compiled from a laser shearography system 200.

Laser shearography testing is known and used in certain nondestructive testing applications. The laser shearography process utilizes a camera system to measure the interferometric properties of a surface in its natural state, using laser light reflection patterns to create an image of the surface, called a reference image. The material is also stressed or excited with thermal energy, and another image is taken, called a final image. If the surface is not completely smooth, the light reflected from the surface will produce a speckle pattern that is recorded by the camera. An image processor compares the reference and final images to produce a phase mapped shearography image that contains indications of damage to the composite material. The inventors recognized that it would be valuable to provide a laser shearography system that can releasably couple to an industrial robot so that the same robot can be configured to conduct laser shearography testing processes and other inspection or repair processes at a given location. Hence, the laser shearography end effector 205 is configured to connect to the JARVIS robot 24 and decouple from the robot so that the same robot can be used to both (i) perform laser shearography testing processes and (ii) perform any other process of the JARVIS cell 10.

Referring to FIGS. 10-13, the laser shearography end effector 205 comprises a laser shearography system 206, a mounting frame 240, a slave tool changer 250, and docking hooks 340. In an exemplary embodiment, the laser shearography system 200 is an LTI-2100 system, from Laser Technology Inc. The laser shearography system 200 comprises a shearography computer 210, a camera interface 220, a laser shearography camera 230, and an excitation system 300. The laser shearography camera 230 comprises a laser system configured to direct a laser toward a target and a digital camera configured to capture images of the target. In an exemplary embodiment, the excitation system 300 comprises a pair of heating lamps 302 configured to apply thermal stress to excite the target surface. Other types of excitation systems such as vacuum excitation systems can also be used without departing from the scope of the disclosure. The laser shearography computer 230 can be configured to run LTI shearography software. Generally speaking, the LTI shearography software comprises a control module that is configured to selective actuate the laser shearography camera 230 and excitation system 300 to take reference and final images of the target surface and an image processing module configured to process the reference and final images from the camera to compute a phase mapped shearography image. It will be understood that shearography computers configured to run other shearography software can also be used without departing from the scope of the disclosure. The camera interface 220 includes analog control devices for certain features of the shearography camera. For example, in the LTI-2100 system, the camera interface 220 comprise controls for fan speed and a safety lock for laser activation.

The mounting frame 240 is configured to support the components of the end effector 205 on the JARVIS robot 24 when in use and in an MTC 110 when docked. The mounting frame 240 has a proximal end portion and a distal end portion spaced apart along a longitudinal axis LA. The mounting frame 240 is configured to mount the laser shearography system 200 so that the shearography camera 230 and the heating lamps 302 face distally along the longitudinal axis LA.

The mounting frame 240 comprises a camera enclosure 242 extending along longitudinal axis. The camera enclosure 242 has four perimeter walls 244, 245, 246, 247 defining a generally rectangular perimeter about the longitudinal axis LA. Opposite first and second perimeter walls 244, 245 are spaced apart along a lateral axis AA perpendicular to the longitudinal axis LA, and opposite third and fourth walls 246, 247 are spaced apart along a transverse axis TA perpendicular to the longitudinal axis and the lateral axis. The enclosure 242 has an open distal end. The shearography camera 230 is received in the camera enclosure 242 so that the imaging and laser output end faces distally out of the open distal end of the camera enclosure. The camera 230 can be fastened to the camera enclosure 242 by bolts or other suitable fasteners.

Figure 11:
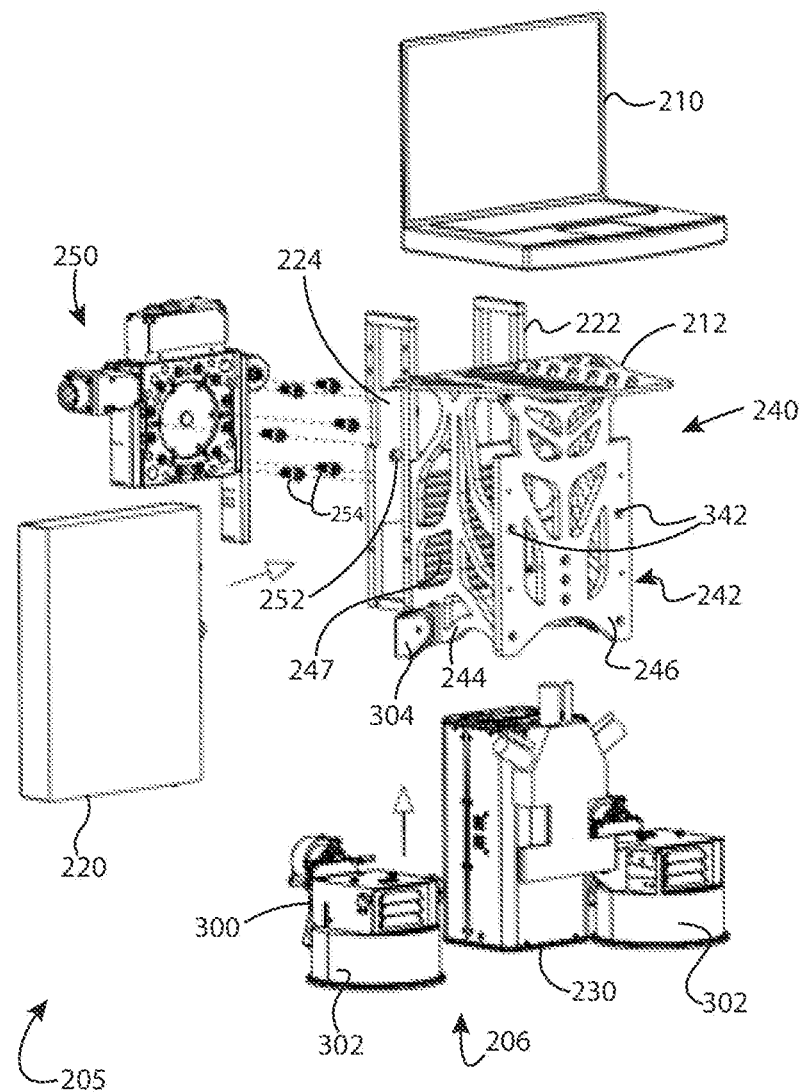
FIG. 11 is an exploded perspective of the laser shearography end effector.
Figure 12:
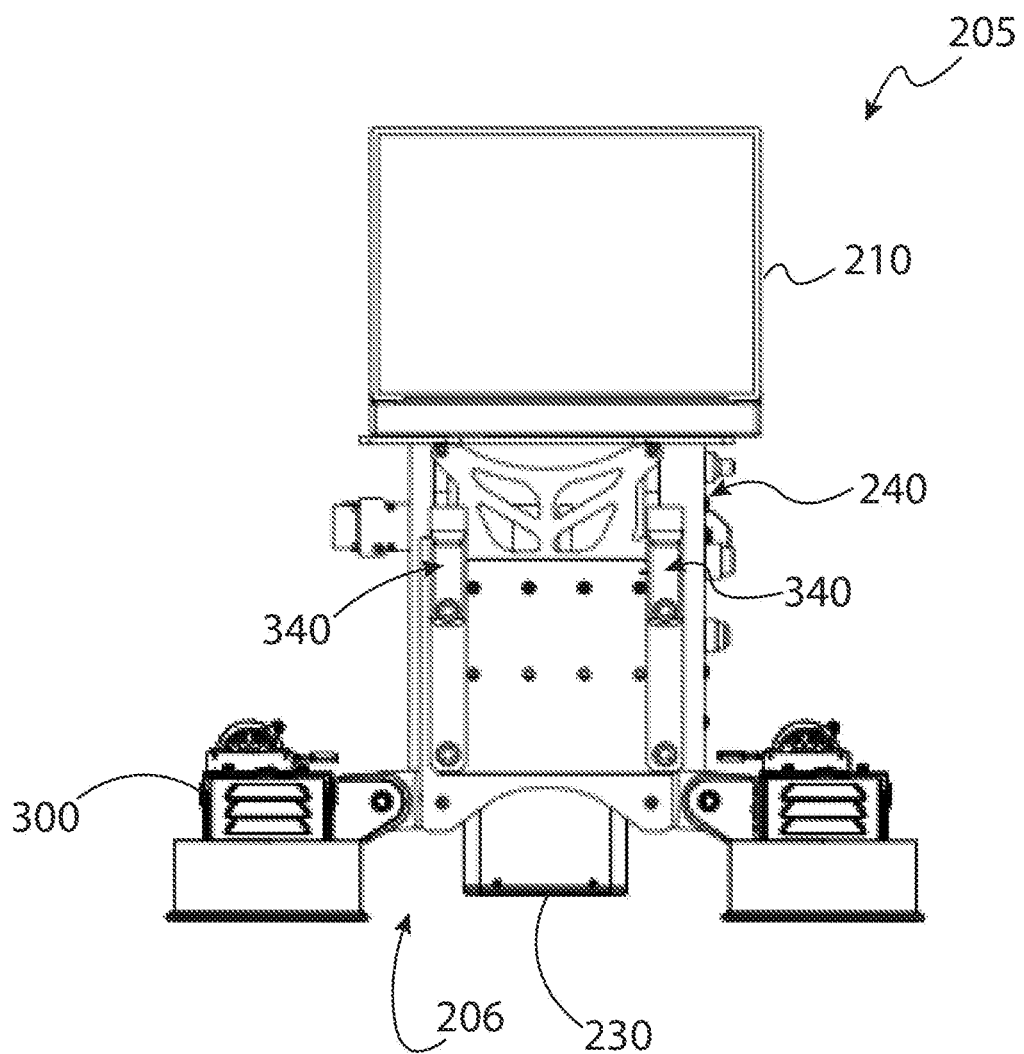
FIG. 12 is an elevation of the laser shearography end effector.
Figure 13:
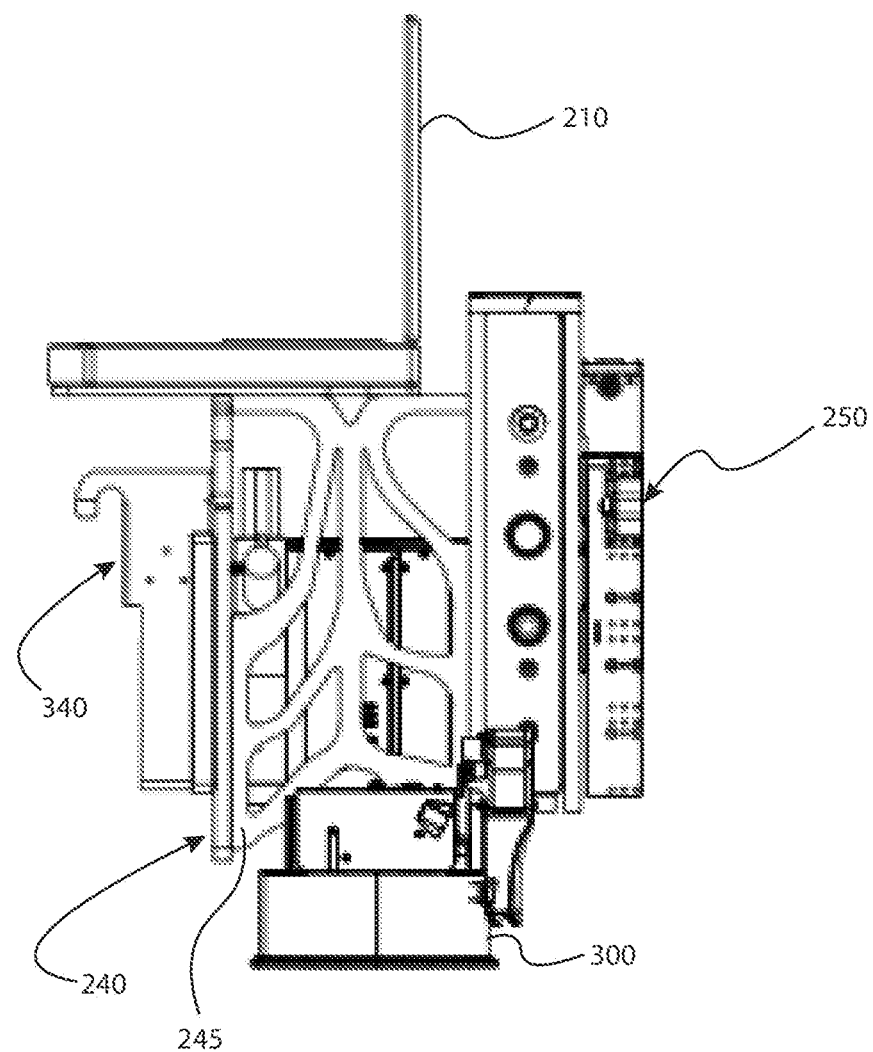
FIG. 13 is another elevation of the laser shearography end effector.

The first and second side walls 244, 245 comprise heat lamp mounts 304 configured for mounting the heat lamps 302 on the camera enclosure 242. The heat lamp mounts 304 are configured to mount the heat lamps 302 so that the heat lamps are spaced apart along the lateral axis AA and the camera 230 is located between them. The heat lamp mounts 304 mount the heat lamps 302 outside the camera enclosure 242. FIG. 11 shows one of the heat lamp mounts 304. The other heat lamp mount is behind the camera enclosure due to the perspective of the drawing. It will be understood that the hidden heat lamp mount 304 can be substantially the same as the one visible in FIG. 11. Each heat lamp 302 fastens to the respective heat lamp mount 304 via a bolt or other suitable fastener.

The third side wall 246 of the heat lamp enclosure 242 defines a docking side of the mounting frame 240. The docking side 246 includes a pair of hook mounts 342 configured to mount the docking hooks 340 on the frame 240. In the illustrated embodiment, the hook mounts 342 comprise bolt holes through which mounting bolts (not shown) can fasten the docking hooks 340 to the mounting frame 240.

The mounting frame 240 further comprises a computer mount 212 on the proximal end of the camera enclosure 242. The computer mount 212 comprises a platform over the proximal end of the enclosure 242. In the illustrated embodiment, the shearography computer 210 is a laptop computer. The bottom of the shearography computer 210 is fastened to the platform mount 212 by screws or other suitable fasteners. The laptop computer 212 is kept open during use of the end effector 205 on the robot 24.

The illustrated mounting frame 240 further comprises an interface mount 222 on the wall 247 opposite the docking wall 246. The interface mount 222 comprises framing that defines a receptacle for receiving the camera interface 220. The interface mount 222 is suitably open on at least one side so that the analog controls of the camera interface 220 are accessible through an open side of the interface mount. The illustrated interface mount 222 includes a wall 224 that defines the robot interface side of the mounting frame 240. The robot interface wall 224 and the docking wall 246 are on opposite ends of the mounting frame 240 along the transverse axis TA.

The robot interface wall 224 defines a tool changer mount 252 for mounting the slave tool changer 250 on the mounting frame 240. The illustrated tool changer mount 252 comprises a set of holes that align with corresponding bolt holes on a body of the slave tool changer 250 so that mounting bolts 254 can fasten the slave tool changer 250 to the robot interface wall 224.

It can be seen that the hook mounts 342 and the tool changer mount 252 mount the docking hooks 340 and the slave tool changer 250 on opposite sides of the mounting frame 240. The docking hooks 340 are configured to hang the end effector 205 in an MTC 110 of the JARVIS cell 10. The docking hooks 340 suspend the end effector 205 so that the slave tool changer 250 faces the doorway of the MTC 110. This allows the robot 24 to access the slave tool changer 250 through the MTC doorway to operatively connect to the end effector 205 in the MTC 110. When the robot 24 is finished using the shearography end effector 205, the robot 24 can move the end effector through the doorway, hang the end effector in the MTC 110 by the docking hooks 350, and disconnect from the slave tool changer 250.

Figure 14:
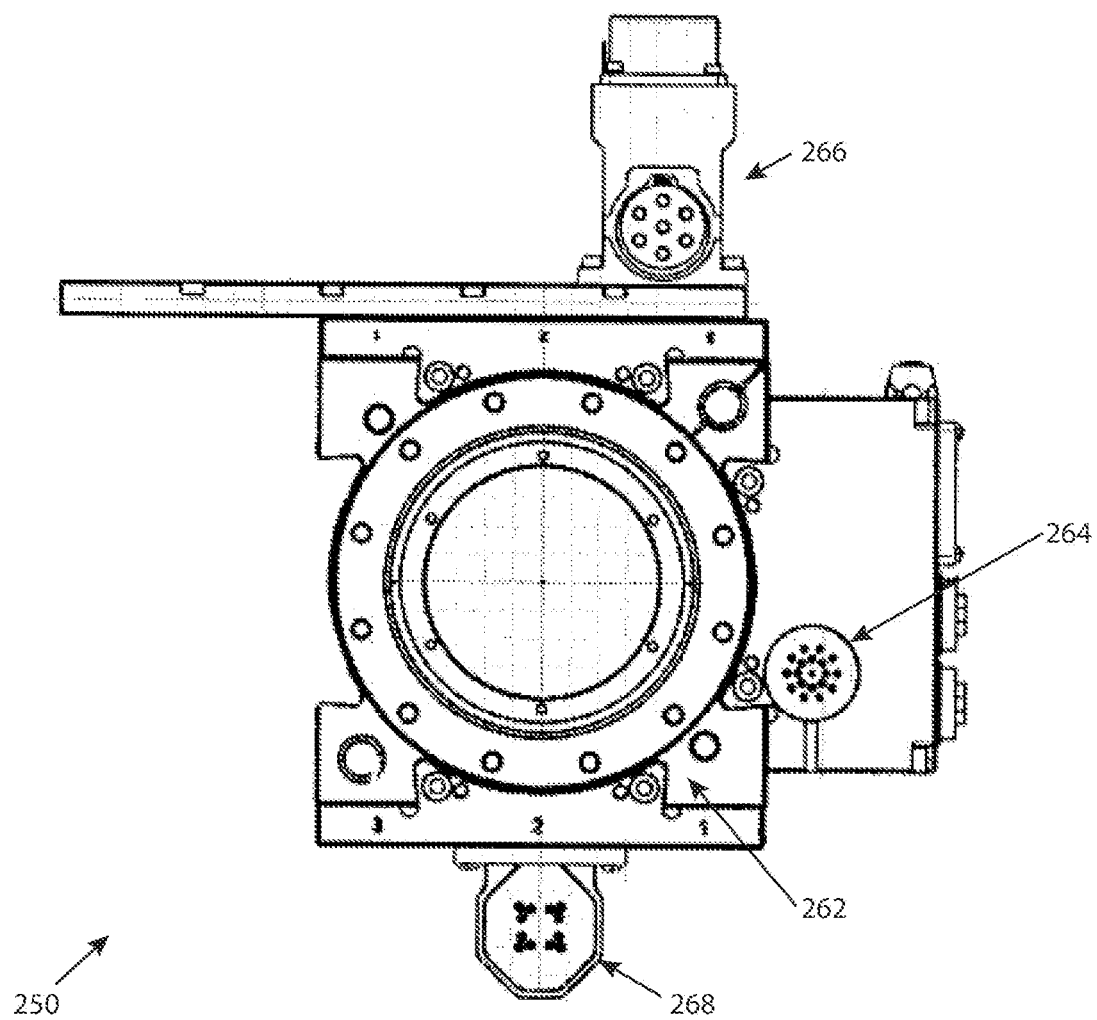
FIG. 14 is an elevation of a slave tool changer of the laser shearography end effector.

Referring to FIG. 14, the slave tool changer 250 is complementary to the master tool changer 26 with connectors configured to operatively connect the end effector 205 to a subset of the connectors of the master tool changer. The illustrated slave tool changer 250 comprises a mounting interface 262 configured for selectively mounting the end effector 205 on the master tool changer 26. The mounting interface 262 comprises a signal connector 264 configured to couple to the mating signal connector 2614 of the master tool changer 26 so that the master tool changer can determine (i) that it has been properly aligned with the slave tool changer for locking and (ii) that it has been connected to the laser shearography end effector 205, as opposed to another robotic tool. After the locking actuator 2612 of the master tool changer 26 locks the slave tool changer 250 to the master tool changer, the tool changers 26, 250 support the shearography end effector 205 on the end of the industrial robot 24 for use in laser shearography nondestructive testing processes. The slave tool changer 250 further comprises a power connector 266 and an Ethernet connector 268, respectively configured to mate with the power connector 2620 and the Ethernet connector 2622 of the master tool changer 26. The mating connectors 2620, 266 convey power from the JARVIS cell 10 to the end effector 205, and the mating connectors 2622, 268 transfer control and data signals between the JARVIS control system 1160 and the end effector.

An exemplary method of using the JARVIS cell in an inspection and repair process that utilizes the laser shearography end effector 205 will now be briefly described. After a composite part is loaded into the JARVIS cell 10 and any desired part identification processes are conducted, the JARVIS cell 10 uses its laser scanners to obtain a three-dimensional (3D) model of the part. The JARVIS software framework then maps the 3D model to robot positioning coordinates for the JARVIS robot 24 so that subsequent robot actions are coordinated in relation to the location of the part inside the cell 10.

After the 3D model is obtained and mapped to the robot coordinate system, non-destructive testing (NDT) is conducted. During inspection, NDT techniques such as laser shearography, pulsed thermography, ultrasonic imaging, etc., are used to obtain NDT images of the part. For each NDT technique applied, the robot 24 can use the master tool changer 26 to couple to the corresponding end effector in an MTC 110, and then the JARVIS control system 1160 can control the robot and the end effector to take the NDT images. After each NDT process is complete, the robot 24 automatically docks the NDT end effector in its MTC 110 and disconnects from the end effector at the master tool changer 26.

To perform NDT using the shearography end effector 205, the JARVIS controller first directs the robot 24 to connect to the shearography end effector in its MTC. The robot 24 aligns the master tool changer 26 with the slave tool changer 250 and brings the tool changers together until the connectors 2614, 264 are mated. This signals the master tool changer 26 that it is operatively aligned with the laser shearography end effector 205. In response, the master tool changer 26 actuates the locking actuator 2612 to lock the slave tool changer 250 to the master tool changer.

The JARVIS software uses the mapping of the 3D model to the robot coordinate system to determine a tool path for the shearography inspection. In an exemplary embodiment, the JARVIS software defines a tool path that enables the cell 10 to take a plurality of overlapping shearography images along a length of the composite part. For example, the defined tool path configures the JARVIS controller to perform the following steps (1)-(n): (1) control the robot 24 to move the end effector 205 to a first image location at which the end effector can capture images of a first region of the composite part and control the shearography end effector at the first image location to generate a phase mapped shearography image of the first region, (2) control the robot to move the end effector to a second image location at which the end effector can capture images of a second region of the composite part that overlaps the first region by a defined overlap amount and control the shearography end effector at the second image location to generate a phase mapped shearography image of the second region, ... (n) control the robot to move the end effector to an nth image location at which the end effector can capture images of an nth region of the composite part that overlaps an (n−1)th region by a defined overlap amount and control the shearography end effector at the nth image location to generate a phase mapped shearography image of the nth region.

In the illustrated embodiment, the JARVIS control system 1160 is configured to remotely utilize the LTI shearography software running on the shearography computer 210 to capture each phase matched shearography image. For example, at each image location, the JARVIS control system 1160 remotely executes a script on the shearography computer 210 that causes the shearography computer to (i) actuate the camera 230 to take a reference image of the part region in an unstressed state, (ii) actuate the excitation system 300 to stress the part region, (iii) actuate the camera 230 to take a final image of the part region in the stressed state, (iv) compute a phase matched image from the reference and final images, and (v) transmit the phase matched image to the JARVIS software framework.

When shearography imaging is complete, the JARVIS control system 1160 directs the robot 24 to dock the shearography end effector 205 in its MTC 110. The robot 24 positions the end effector 205 so that the docking hooks 340 hook onto a hanger of the MTC 110 and then actuates the locking actuator 2612 to release the slave tool changer 250 from the master tool changer 26. This disconnects the robot 24 from the shearography end effector 205 so that the robot can connect to other end effectors to perform other cell processes.

When the laser shearography imaging is complete, the JARVIS software is configured to automatically stitch together the overlapping phase matched images using the automated stitching techniques described in U.S. patent application Ser. No. 17/828,558, to obtain a composite laser shearography image for the part. In some instances, one or more of the individual shearography images in the composite image may be defective. In certain embodiments, a user may flag a defective shearography image. In some embodiments, the JARVIS software can comprise a software module that is configured to automatically detect defective images based on image thresholds for brightness, relative amounts of contrast from adjacent shearography images, etc. When defective images are identified, the JARVIS control system 1160 is configured to automatically control the industrial robot 24 and the shearography end effector 205 to take a replacement laser shearography image of the composite part at the image capture location for each of the defective images. The JARVIS software framework stitching module is then configured to use the second laser shearography image in place of each defective image in the composite laser shearography image.

After obtaining the composite shearography image, the JARVIS software framework can store the composite shearography image for the composite part in the JARVIS database as part of the digital twin for the composite part. In addition, based on the composite shearography images and any other NDT images taken during NDT processes, the JARVIS software or a human inspector identifies any damage to the composite part. The JARVIS software then maps a bounding box for each damage area to robot positioning coordinates to create repair section coordinates from which scarfing and surface preparation tool paths can be generated.

After determining the repair section coordinates, the JARVIS cell 10 is configured to automatically perform certain steps of a repair process. As explained in U.S. patent application Ser. No. 17/828,558, the JARVIS cell 10 is configured to automatically perform both skin scarf patch repairs and core splice repairs. Initially, the JARVIS software framework operates the robot 24 to connect (via master tool changer 26) to a milling end effector (not shown). Then, based on the repair section coordinates determined above, the JARVIS software framework controls the robot 24 and the milling end effector to remove a predefined geometry of material from the composite part.

After damage is removed, the JARVIS cell 10 can prepare the surface of the repair area for adhesive bonding. Surface preparation can be conducted in non-automated fashion using a conventional atmospheric plasma system of the type available from Plasmatreat. Alternatively, the JARVIS cell 10 can direct the robot 24 to decouple from the milling end effector and couple to an atmospheric plasma end effector 101 of the type described in U.S. Provisional Patent Application No. 63/271,506, which is hereby incorporated by reference in its entirety. The robot 24 then moves the atmospheric plasma end effector (not shown) along the defined tool path while the atmospheric plasma system operates to clean the surface and increase surface free energy for adhesive bonding.

After surface treatment is complete, a test can be conducted to determine bond readiness. The bond readiness test can be conducted in non-automated fashion using a laboratory surface analyst system such as the BTG Labs Surface Analyst XA system. Alternatively, the JARVIS cell 10 can be configured to automatically conduct a bond readiness test using a surface analyst end effector of the type described in U.S. Provisional Patent Application No. 63/271,541, which is hereby incorporated by reference in its entirety. In this case, the JARVIS cell docks the previous end effector in its MTC 110, then connects to the surface analyst end effector, and conducts an automatic bond readiness test of the treated surfaces to determine readiness for bonding. If the bond readiness test indicates the treated surface is not ready for adhesive bonding, the JARVIS cell can repeat the atmospheric plasma surface treatment until bond readiness testing indicates the desired surface characteristics are achieved.

After the surface is treated and bond readiness is established by testing, a repair material can be applied to the treated area. The repair can be conducted using the principles described in U.S. patent application Ser. No. 17/828,558.

For some multilayer scarf repairs, after a first patch is adhered to the repair area, before a subsequent patch is applied, the JARVIS cell 10 can optionally repeat the surface treatment and bond readiness test sub-processes for each subsequent patch.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claimed is:

1. A laser shearography end effector for inspection in an automated inspection and repair system for composite parts, the laser shearography end effector comprising:
   a frame;
   a laser shearography system supported on the frame for movement with the frame, the laser shearography system including an excitation system and a laser shearography camera; and
   a slave tool changer secured to the frame, the slave tool changer configured to releasably and operatively connect the laser shearography end effector to an industrial robot such that the industrial robot can move the laser shearography end effector along a work piece for inspecting the work piece and such that the laser shearography end effector is interchangeable with at least one other automatic inspection end effector or repair end effector of the automated inspection and repair system.

2. The laser shearography end effector of claim 1, further comprising a docking hook secured to the frame for suspending the laser shearography end effector in a ready position when disconnected from the industrial robot.

3. The laser shearography end effector of claim 2, wherein the laser shearography system further comprises a laser shearography computer, wherein the frame has a proximal end portion and a distal end portion spaced apart along a longitudinal axis, wherein shearography end effector further comprises a computer mount for mounting the laser shearography computer on the proximal end portion of the frame, wherein the excitation system and the laser shearography camera are mounted on the distal end portion of the frame and the support hook is mounted adjacent the proximal end portion of the frame.

4. The laser shearography end effector of claim 2, wherein the docking hook and the slave tool changer are on opposite sides of the frame.

5. The laser shearography end effector of claim 1, wherein the laser shearography system draws power through the slave tool changer.

6. The laser shearography end effector of claim 1, wherein the laser shearography system further comprises a laser shearography computer, wherein the laser shearography computer is configured to control the laser shearography system to take at least one laser shearography image of the composite part by a controlled laser shearography image capture process comprising:
   taking a first image of the composite part with the laser shearography camera;
   exciting the composite part with the excitation system;
   taking a second image of the excited composite part with the laser shearography camera; and
   them combining the first and second images to obtain the laser shearography image.

7. The laser shearography end effector of claim 6, wherein the controller is configured to control the laser shearography system to sequentially take a plurality of overlapping laser shearography images of the composite part using the controlled laser shearography image capture process for each image.

8. The laser shearography end effector of claim 1, wherein the excitation system comprises a heat lamp.

9. A method of inspecting a composite part, the method comprising:
   connecting a master tool changer of an industrial robot to the slave tool changer of the laser shearography end effector of claim 1 whereby the laser shearography end effector is mounted on an end of the industrial robot for movement with the industrial robot and the laser shearography end effector is operatively connected to the master tool changer for drawing power from a power system of an automated inspection and repair system and for communication with a master controller of the automated inspection and repair system;
   subsequently using the industrial robot and the laser shearography end effector to inspect the composite part;
   subsequently disconnecting the laser shearography end effector from the industrial robot; and
   subsequently using the industrial robot with another end effector to perform another inspection or repair operation on the composite part.

10. The method of claim 9, wherein said using the industrial robot and the laser shearography end effector to inspect the composite part comprises controlling the industrial robot and the laser shearography end effector via the master controller to take a plurality overlapping laser shearography images of the composite part.

11. The method of claim 10, wherein said controlling the industrial robot and the laser shearography end effector via the master controller to take a plurality overlapping laser shearography images of the composite part comprises controlling the industrial robot to move the laser shearography end effector to a plurality of predetermined image capture locations for the plurality of overlapping laser shearography images, and at each of the predetermined image capture locations, actuating the laser shearography system to capture a respective laser shearography image.

12. The method of claim 11, wherein in response to each instance of said actuating the laser shearography system to capture a respective laser shearography image, conducting by the controller of the laser shearography system a laser shearography image capture process comprising:

taking a first image of the composite part with the laser shearography camera;

exciting the composite part with the excitation system;

taking a second image of the excited composite part with the laser shearography camera; and combining the first and second images to obtain the respective laser shearography image.

13. The method of claim 11, wherein said using the industrial robot and the laser shearography end effector to inspect the composite part further comprises automatically stitching the plurality overlapping laser shearography images of the composite part to make a composite laser shearography image of the composite part.

14. The method of claim 12, wherein said using the industrial robot and the laser shearography end effector to inspect the composite part further comprises automatically identifying one or more defects in the composite part based on the composite laser shearography image.

15. The method of claim 12, wherein said using the industrial robot and the laser shearography end effector to inspect the composite part further comprises determining that one or more of the overlapping laser shearography images is a defective image, and in response to said determining, controlling the industrial robot and the laser shearography end effector via the master controller to take a second laser shearography image of the composite part at the predetermined image capture location for each of the defective images and using each second laser shearography image in place of each defective image in the composite laser shearography image.

16. The method of claim 11, further comprising, before inspecting the composite part, scanning the composite part to obtain a three-dimensional model of the composite part.

17. The method of claim 16, further comprising, mapping the three-dimensional model to robot positioning coordinates to coordinate movement of the robot to the composite part.

18. The method of claim 17, further comprising, determining the image capture locations based on said mapping of the three dimensional model to robot positioning coordinates.

19. An automatic inspection and repair system comprising:

an industrial robot;

the laser shearography end effector of claim 1; and a control system configured to control both the industrial robot and the laser shearography end effector to coordinate robot positioning and shearography imaging for inspecting a composite part.

20. The industrial robot system as set forth in claim 19, further comprising another robot end effector for performing a composite part inspection and repair process selected from a list of composite part inspection and repair processes consisting of: non-destructive testing, surface preparation, scarfing, and patch making;

wherein the industrial robot comprises a master tool changer configured to interchangeably connect to the laser shearography end effector of claim 1 and said another robot end effector and wherein the control system is further configured to control the industrial robot and said another end effector to coordinate movement of the industrial robot with use of said another robot end effector for performing said composite part inspection and repair task on the composite part.

* * * * *